(12) United States Patent
Haulk et al.

(10) Patent No.: US 6,535,119 B1
(45) Date of Patent: Mar. 18, 2003

(54) SYSTEM AND METHOD OF MANAGING FAILURE OF AN ELECTRONIC SHELF LABEL TO RESPOND TO A MESSAGE

(75) Inventors: Kevin W. Haulk, Griffin, GA (US); Cheryl K. Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/896,316

(22) Filed: Jun. 29, 2001

(51) Int. Cl.[7] .................................. G08B 23/00
(52) U.S. Cl. ............... 340/502; 340/5.91; 340/5.92; 705/14; 705/20; 705/21; 705/28
(58) Field of Search ................ 340/502, 5.91, 340/5.92; 705/14, 21, 20, 28

(56) References Cited

U.S. PATENT DOCUMENTS

| | | | |
|---|---|---|---|
| 4,002,886 A | 1/1977 | Sundelin | 235/61.7 R |
| 4,500,880 A | 2/1985 | Gomersall et al. | 340/825.35 |
| 4,962,466 A | 10/1990 | Revesz et al. | 364/518 |
| 5,172,314 A | 12/1992 | Poland et al. | 364/401 |
| 5,241,467 A | 8/1993 | Failing et al. | 364/401 |
| 5,245,534 A | 9/1993 | Waterhouse et al. | 364/404 |
| 5,448,226 A | 9/1995 | Failing, Jr. et al. | 340/825.35 |
| 5,704,049 A | * 12/1997 | Briechle | 395/326 |
| 5,818,346 A | 10/1998 | Goodwin, III et al. | 340/825.49 |
| 6,011,487 A | 1/2000 | Plocher | 340/825.49 |
| 6,046,682 A | 4/2000 | Zimmerman et al. | 340/825.49 |

* cited by examiner

*Primary Examiner*—Daryl Pope
(74) *Attorney, Agent, or Firm*—Paul W. Martin

(57) ABSTRACT

A system and method of managing failure of an electronic shelf label to respond to a message which conserves system bandwidth. The system includes an electronic shelf label which fails to respond to a first message, and a computer for resending the first message to the electronic shelf label at a first rate during a first time period, for identifying the electronic shelf label as unresponsive if the computer fails to receive an acknowledgment from the electronic shelf label during the first time period, and for sending a second message for determining whether the electronic shelf label exists at a second rate during a second time period.

14 Claims, 2 Drawing Sheets

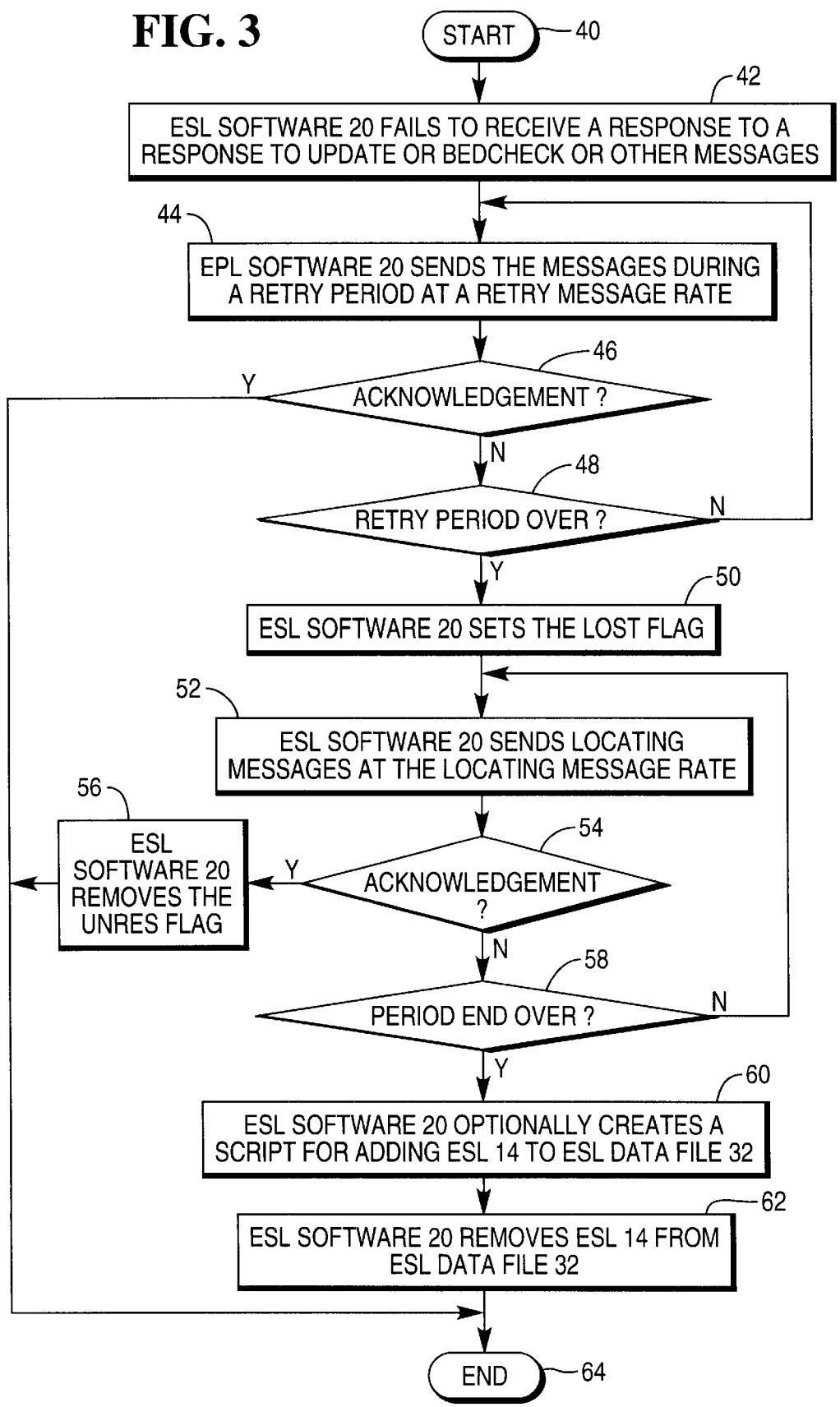

SYSTEM AND METHOD OF MANAGING FAILURE OF AN ELECTRONIC SHELF LABEL TO RESPOND TO A MESSAGE

BACKGROUND OF THE INVENTION

The present invention relates to electronic shelf label (ESL) systems, and more specifically to a system and method of managing failure of an electronic shelf label to respond to a message.

ESL systems typically include a plurality of ESLs for merchandise items in a transaction establishment. ESLs typically display the price of corresponding merchandise items on store shelves and are typically attached to a rail along the leading edge of the shelves. A transaction establishment may contain thousands of ESLs to display the prices of the merchandise items. The ESLs are coupled to a central server from where information about the ESLs is typically maintained in an ESL database or data file. Price information displayed by the ESLs is obtained from a price look-up (PLU) data file and stored within an ESL price change record.

Inevitably, some ESLs do not or cannot communicate. Failures may be caused by poor location or a malfunction with the ESLs. When communication is poor, ESL system performance degrades because message queues are lengthened and because bandwidth is used to attempt to communicate with unresponsive ESLs. The situation is aggravated by the need to verify data integrity using more messages.

Therefore, it would be desirable to provide a system and method of managing failure of an electronic shelf label to respond to a message.

SUMMARY OF THE INVENTION

In accordance with the teachings of the present invention, a system and method of managing failure of an electronic shelf label (ESL) to respond to a message is provided.

The system includes an electronic shelf label which fails to respond to a first message, and a computer for resending the first message to the electronic shelf label at a first rate during a first time period, for identifying the electronic shelf label as unresponsive if the computer fails to receive an acknowledgment from the electronic shelf label during the first time period, and for sending a second message for determining whether the electronic shelf label exists at a second rate during a second time period.

It is accordingly an object of the present invention to provide a system and method of managing failure of an electronic shelf label to respond to a message.

It is another object of the present invention to phase out data communication attempts to unresponsive ESLs.

It is another object of the present invention to maximize ESL system bandwidth by minimizing overall communications to unresponsive ESLs.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating software operation.

DETAILED DESCRIPTION OF THE PREFERRED EMBODIMENT

Figure 1:
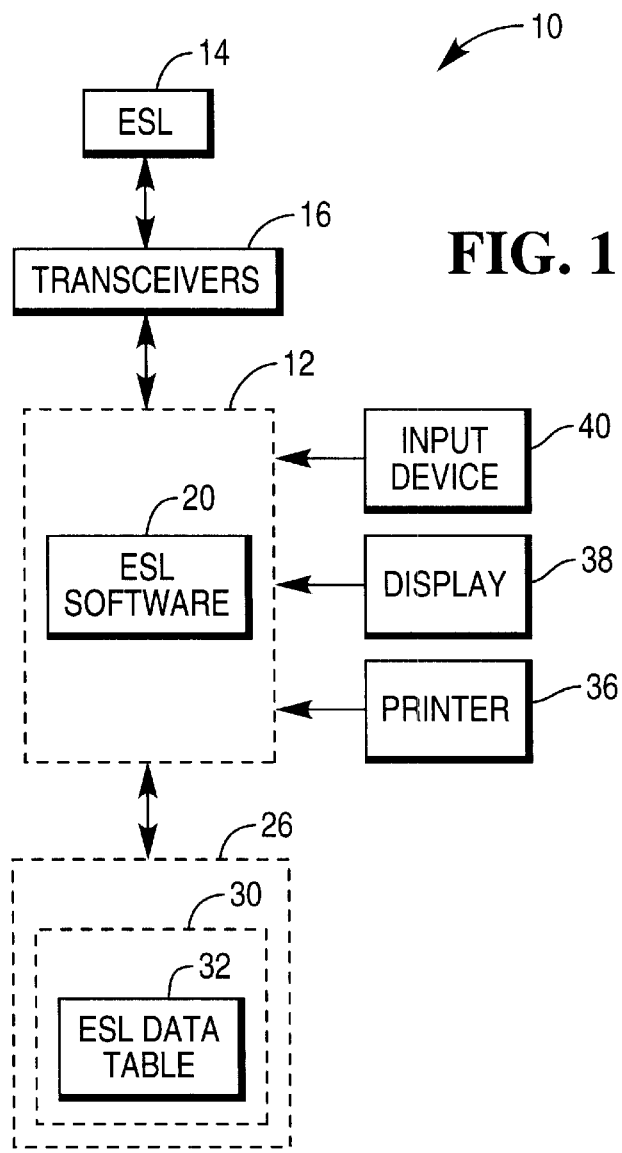
FIG. 1 is a block diagram of a transaction processing system.

Referring now to FIG. 1, ESL system 10 primarily includes host computer system 12 and ESLs 14.

ESLs 14 display price and other data, such as promotional data.

Host computer system 12 executes ESL software 20, which is responsible for scheduling and transmitting messages containing commands and/or data, such as price and promotional data, to ESLs 14.

In particular, ESL software 20 is responsible for initiating a search for a lost ESL 14. A find sequence of may be triggered by a failed status or "bedcheck" attempt or a failed display update attempt.

ESL software 20 initiates a retry period to attempt to communicate with ESL 14 after it fails to respond, and either receives a response or marks ESL 14 as unresponsive. If ESL software 20 flags ESL 14 as unresponsive, ESL software 20 initiates a locating period to attempt to communicate, but preferably does not continue to send update or bedcheck messages to conserve system bandwidth.

An operator may configure retry and locating period parameters using input device 40, which is preferably a keyboard. ESL software 20 may provide the operator with information or reports to assist in managing ESLs 14 through display 38 or printer 36.

ESL software 20 maintains ESL database 30, which includes data table 32. In addition to other data, ESL data table 32 contains ESL assignments, including ESL identification information and item identification information.

To assist with execution of certain tasks performed by ESL software 20, host computer system 12 includes a built-in time keeping device, commonly referred to as a system clock, which is synchronized with current time, in order to automatically execute the tasks at their scheduled times.

ESL storage medium 26 stores ESL database 30. ESL storage medium 26 is preferably a fixed disk drive.

ESL system 10 may be a wired or wireless system or a combination of both. If wireless, ESL system 10 preferably includes transceivers 16 which transmit and receive messages from ESLs 14.

Figure 2:
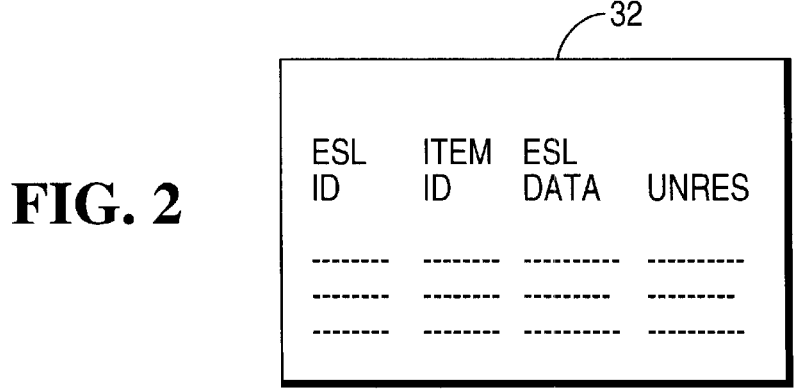
FIG. 2 is a diagram showing data files used within a transaction establishment.

Turning now to FIG. 2, ESL data table 32 is shown in more detail.

ESL data table 32 may include a line entry for each ESL 14 in ESL system 10. Each line entry has an ESL identification entry (ESL ID), an item identification entry (ITEM ID), a display data entry (ESL DATA), and an ESL unresponsive flag entry (UNRES).

Entry ESL ID identifies an ESL.

Entry ITEM ID identifies a store item associated with the ESL.

Entry ESL DATA is a full image of all representable data currently being displayed by ESL 14.

Entry UNRES is a flag which is set after a chosen number of retry periods has expired. An UNRES flag indicates that an attempt to find an ESL 14 that is not answering has failed.

In one embodiment, ESL software 20 tries to communicate with ESL 14 after it fails to respond to an update or bedcheck message. During a retry period, ESL software 20 tries to communicate with ESL 14 an unlimited number of times by sending messages at a given rate until at least both a minimum retry time has passed and a minimum number of messages have been sent. After the minimum retry number and minimum messages have been reached, messages end when either a maximum number of retry attempts is reached, or until a maximum retry period is reached, whichever comes first.

ESL software 20 either receives a response or sets the UNRES flag. If ESL software 20 flags ESL 14 as unresponsive, ESL software 20 re-initiates communication and makes one additional attempt to communicate, but discontinues sending of update or bedcheck messages to ESL 14 to limit unnecessary messages and conserve bandwidth. During this attempt, the time period is infinite, but the message rate is lower in order to conserve overall ESL system bandwidth.

If this or further attempts to communicate with ESL 14 fail, then ESL software 20 may optionally remove the record from ESL data table 32. If ESL 14 is removed, then ESL software 20 may optionally generate a script for adding back ESL 14 as a new ESL if it ever responds, or in case it is removed due to ESL system error.

Turning now to FIGS. 3A and 3B, operation of ESL software 20 is illustrated in more detail beginning with START 40.

In step 42, ESL software 20 fails to receive a response to update or bedcheck messages, or other type of message.

In step 44, ESL software 20 sends the messages during a retry period at a retry message rate.

In step 46, ESL software 20 waits for an acknowledgement from ESL 14. If ESL software 20 receives an acknowledgement, operation ends at step 64. Otherwise, operation proceeds to step 48.

In step 48, ESL software 20 waits for the end of the message retry period. If ESL software 20 determines that the retry period has not ended, operation returns to step 44 to continue sending messages. Otherwise, operation proceeds to step 50.

In step 50, ESL software 20 sets the UNRES flag.

In step 52, ESL software 20 sends locating messages at a locating message rate.

In step 54, ESL software 20 waits for an acknowledgement from ESL 14. If ESL software 20 receives an acknowledgement, ESL software 20 clears the UNRES flag in step 56 and operation ends at step 64. Otherwise, operation proceeds to step 58.

In step 58, ESL software 20 determines whether the locating period is over. If not, operation returns to step 52. Otherwise, operation proceeds to step 60.

In an alternate embodiment, locating messages being sent indefinitely, without an end to the locating period.

In step 60, ESL software 20 optionally creates a script for adding a record for ESL 14 to ESL data table 32, in case of ESL system error.

In step 62, ESL software 20 removes ESL 14 from ESL data table 32.

Alternatively, one may consider that use of the UNRES flag would suffice. Since no update or bedcheck messages are sent to an unresponsive ESL 14, use of the UNRES flag produces almost the same effect as deleting the record.

In step 64, operation ends.

Although the present invention has been described with particular reference to certain preferred embodiments thereof, variations and modifications of the present invention can be effected within the spirit and scope of the following claims.

We claim:

1. An electronic shelf label system comprising:
    an electronic shelf label which fails to respond to a message containing data; and
    a computer for resending the message to the electronic shelf label at a first rate during a first time period, for identifying the electronic shelf label as unresponsive if the computer fails to receive an acknowledgment from the electronic shelf label during the first time period, and for sending a locating message at a second rate lower than the first rate during an indefinite time period.

2. A method of managing failure of an electronic shelf label to respond to a message comprising the steps of:
    resending the message to the electronic shelf label at a first rate during a first time period in response to the failure;
    identifying the electronic shelf label as unresponsive if an acknowledgment from the electronic shelf label is not received during the first time period; and
    sending another message for determining whether the electronic shelf label exists at a second rate during a second time period.

3. The method as recited in claim 2, further comprising the steps of:
    creating a script for adding the electronic shelf label to a record of installed electronic shelf labels; and
    removing the electronic shelf label from the record if the acknowledgment is not received during the second time period.

4. The method as recited in claim 2, wherein the step of sending comprises the substep of:
    sending another message at a second rate which is lower than the first rate.

5. The method as recited in claim 2, wherein the step of sending comprises the substep of:
    sending another message during a second time period which is indefinite.

6. A method of managing failure of an electronic shelf label to respond to a message containing data comprising the steps of:
    resending the message to the electronic shelf label at a first rate during a first time period in response to the failure;
    identifying the electronic shelf label as unresponsive if an acknowledgment from the electronic shelf label is not received during the first time period; and
    sending another message without the data at a second rate.

7. An electronic shelf label system comprising:
    an electronic shelf label which fails to respond to a first message; and
    a computer for resending the first message to the electronic shelf label at a first rate during a first time period, for identifying the electronic shelf label as unresponsive if the computer fails to receive an acknowledgment from the electronic shelf label during the first time period, and for sending a second message for determining whether the electronic shelf label exists at a second rate during a second time period.

8. The system as recited in claim 7, wherein the computer also creates a script for adding the electronic shelf label to a record of installed electronic shelf labels, and removes the electronic shelf label from the record if the computer fails to receive the acknowledgment during the second time period.

9. The system as recited in claim 7, wherein the second rate is lower than the first rate.

10. The system as recited in claim 7, wherein second time period is indefinite.

11. An electronic shelf label system comprising:
   an electronic shelf label which fails to respond to a first message containing data; and
   a computer for resending the first message to the electronic shelf label at a first rate during a first time period, for identifying the electronic shelf label as unresponsive if the computer fails to receive an acknowledgment from the electronic shelf label during the first time period, and for sending a second message without the data at a second rate during a second time period.

12. A method of managing failure of an electronic shelf label to respond to a first type of message comprising the steps of:
   resending the first type of message to the electronic shelf label at a first rate during a first time period in response to the failure;
   identifying the electronic shelf label as unresponsive if an acknowledgment from the electronic shelf label is not received during the first time period; and
   sending a different type of message for determining whether the electronic shelf label exists at a second rate lower than the first rate during a second time period.

13. A method of managing failure of an electronic shelf label to respond to a bedcheck message comprising the steps of:
   resending the bedcheck message to the electronic shelf label at a first rate during a first time period in response to the failure;
   identifying the electronic shelf label as unresponsive if an acknowledgment from the electronic shelf label is not received during the first time period; and
   sending a locating message for determining whether the electronic shelf label exists at a second rate lower rate than the first rate for an indefinite period of time.

14. A method of managing failure of an electronic shelf label to respond to a message comprising the steps of:
   determining a minimum number of retry attempts;
   resending the message to the electronic shelf label at a first rate during a first retry period in response to the failure;
   counting the messages sent during the first retry period;
   if a count of the messages equals the minimum number of retry attempts and an acknowledgment from the electronic shelf label is not received, identifying the electronic shelf label as unresponsive; and
   sending a locating message for determining whether the electronic shelf label exists at a second rate lower than the first rate during a the second retry period.

* * * * *